United States Patent [19]

Fanta et al.

[11] Patent Number: 4,839,450

[45] Date of Patent: Jun. 13, 1989

[54] MOISTURE-SHRINKABLE FILMS FROM STARCH GRAFT COPOLYMERS

[75] Inventors: George F. Fanta; Felix H. Otey, both of Peoria, Ill.

[73] Assignee: The United States of America as represented by the Secretary of Agriculture, Washington, D.C.

[21] Appl. No.: 123,411

[22] Filed: Nov. 17, 1987

[51] Int. Cl.$^4$ .............................. C08L 1/14; C08L 3/16
[52] U.S. Cl. .................................. 527/313; 527/314; 523/128; 260/DIG. 43
[58] Field of Search ............... 527/300, 313, 314, 315; 523/128; 260/DIG. 43

[56] References Cited

U.S. PATENT DOCUMENTS

| | | | |
|---|---|---|---|
| 4,026,849 | 5/1977 | Bagley et al. | 527/314 |
| 4,156,664 | 5/1979 | Skinner et al. | 527/312 |
| 4,280,937 | 7/1981 | Bart et al. | 527/314 |
| 4,282,121 | 8/1981 | Goodrich | 527/312 |
| 4,337,181 | 6/1982 | Otey et al. | 523/128 |
| 4,722,815 | 2/1988 | Shibanai | 527/300 |

OTHER PUBLICATIONS

Brandrup et al., (Editors), Polymer Handbook, 2nd Edition, pp. III-143, III-144, III-151, John Wiley & Sons, 1975.
R. J. Dennenberg et al., "A New Biodegradable Plastic Made from Starch Graft Poly(methyl Acrylate) Copolymer," J. Appl. Polym. Sci., 22:459–465, (1978).

Primary Examiner—John Kight
Assistant Examiner—Nathan M. Nutter
Attorney, Agent, or Firm—M. Howard Silverstein; John D. Fado; Curtis P. Ribando

[57] ABSTRACT

Moisture-shrinkable films can be extrusion blown from modified starch-poly(methyl acrylate) graft compolymers. The films shrink when exposed at room temperature to relative humidities approaching 100%. The films have potential application in shrink-wrapping irregularly shaped articles without application of heat; they are easily removed by water washing.

17 Claims, No Drawings

MOISTURE-SHRINKABLE FILMS FROM STARCH GRAFT COPOLYMERS

BACKGROUND OF THE INVENTION

1. Field of the Invention

The United States produces more than 6 billion lb. of plastic film each year, virtually all of which is made from petroleum-based raw materials. These films are made most economically by the extrusion blowing process in which a tubular extruded bubble is expanded and shaped by air streams at the exit of the extruder die. In many packaging applications, it is desirable that a film be shrinkable so that it can be made to fit the contours of irregularly shaped articles. Shrink films are now widely used in the packaging industry.

The long-term uncertainty of prices and supplies of petroleum has sustained interest in alternative sources of raw materials for making plastics. This invention relates to the preparation of shrink films by the blowing of formulations based on a renewable resource.

2. Description of the Prior Art

In U.S. Pat. No. 4,026,849, Bagley et al. teach the preparation of plastic articles by extrusion of compositions comprising graft copolymers of starch and thermoplastic polymers such as poly(methyl acrylate). The resultant products are water-resistant, yet biodegradable; and they conserve valuable petroleum resources, because the starch portion serves as an extender for the petroleum-based polymer. Dennenberg et al. [J. Appl. Polym. Sci. 22: 459–465 (1978)]teach that starch graft poly(methyl acrylate) copolymers can be extruded into products having excellent initial tensile strength and elongation properties. However, simple extrusion is a relatively slow process that is considerably more expensive than the more conventional extrusion blowing technique. We found that this graft copolymer of unmodified starch and methyl acrylate can not be extrusion blown to give continuous films because of its particulate nature.

The shrink films now available commercially require the application of heat to the film. Heat shrinkability arises from an elastic memory imparted to some thermoplastic films during their manufacture by either stretch orientation or by cross-linking induced through irradiation. Shrinkage takes place when heat is applied to the film, and it tends to revert to its original unoriented state. Films that can be shrunk by simple exposure to high relative humidity at room temperature have not been reported.

SUMMARY OF THE INVENTION

It has now been unexpectedly discovered that starch-poly(methyl acrylate) graft copolymers prepared from hot water-soluble modified starches can be processed to produce moisture-shrinkable films. As formulations of the copolymer and a plasticizer are shaped into films, they are stretched to induce biaxial orientation of the shaped product. The resultant films are dimensionally stable at low to moderate relative humidities, but they shrink when exposed at ambient temperatures to relative humidities approaching 100%. When placed around three-dimensional objects, these films conform to the shape of the object without formation of stress cracks and they can be easily removed later after soaking the wrapped objects briefly in water.

In accordance with these discoveries, it is an object of this invention to provide starch-containing, flexible, uniform, self-supporting films which are moisture-shrinkable at ambient temperatures.

Another object of the invention is to provide moisture-shrinkable films which are especially advantageous for packaging irregularly shaped objects.

It is also an object of the invention to provide packaging films that can be easily removed from encapsulated objects after soaking in water.

It is a further object of the invention to prepare the subject films by a conventional extrusion blowing method.

Other objects and advantages of the invention will become readily apparent from the ensuing disclosure.

DETAILED DESCRIPTION OF THE INVENTION

"Films," such as those made in accordance with the invention, are defined by the polymer industry (Encyclopedia of Polymer Science and Technology, John Wiley & Sons, Inc., 1967, Vol. 6, page 764) as "shaped plastics that are comparatively thin in relation to their breadth and width and have a maximum thickness of 0.010 in." Self-supporting films are those capable of supporting their own weight. "Uniform films," as used in this application, refer to those which are virtually free of breaks, tears, holes, bubbles, and striations.

The term "extrusion blowing" is well known in the art and distinguishes from simple extrusion in that it relates to shaping a tubular extrudate or "bubble" into its final form by internal and external cooling streams of air, the internal stream causing expansion of the bubble to several times the size of the die opening. Films prepared by this technique are commonly referred to as "blown films." "Moisture-shrinkable," as used herein, refers to films that can be shrunk by simple exposure to high relative humidity (near 100%) at ambient temperatures (less than 35° C.).

The starch-based films of the invention are prepared from modified starch products such as partially depolymerized starches and derivatized starches that are soluble in hot waer. Examples of partially depolymerized starches are acid-modified starches, oxidized starches, enzyme-degraded starches, heat-treated starches, mechanically-degraded starches, and starches that have been jet cooked under conditions of high temperature and pressure. Examples of derivatized starches are cationic starches, starch ethers, and starch esters. It is essential for film formation that these starches be substantially completely dissolved or dispersed in water prior to graft polymerization; i.e., the starches must be dispersed beyond the gelatinization point, which occurs in the presence of water at about 60° C. We have found that satisfactory dispersions are obtained when the modified starch is heated in water for 30 min. at 95° C.

Graft polymerization of vinyl and acrylic monomers onto starch and other polysaccharides is well known in the prior art, and a number of reviews on this subject have appeared in the literature [e.g., J. C. Arthur Jr., Advan. Macromol. Chem. 2: 1 (1970)]. Any monomer yielding a thermoplastic homopolymer having a glass transition temperature of less than about 35° C. can be used in the invention. An example of such a polymer is poly(methyl acrylate), which has a glass transition temperature of 8° C. However, it is to be understood that other polymers can be used if they flow at normal or ambient temperatures. Many methods are known for the initiation of graft polymerization, e.g., ceric ion, cobalt-60 irradiation, electron beam irradiation, ozone, ferrous ion-peroxide, or other redox systems; and any of these known methods will yield the graft copolymers of the instant invention.

Extrusion blowing is the preferred method of forming the films of this invention. However, simple extrusion is a viable alternative for film formation provided it is accompanied by stretching of the film to induce biaxial orientation, a practice that is well known in the prior art. The preferred percent add-on, or weight percent synthetic polymer incorporated in the graft copolymer, is about 40 to 70%. Prior to extrusion, it is essential that the graft copolymers be plasticized with water or some other plasticizing agent in a suitable amount; that is, an amount that will promote uniform, continuous flow through the extruder and that will yield a dimensionally stable film. We have found that good films are obtained when the moisture content prior to extrusion blowing is in the range of about 15-20% based on the weight of the blended composition, and the moisture content after extrusion is about 10% of the resulting film.

Urea is an optional additive which facilitates extrusion of the films of this invention; the preferred concentration is about 5% of the dry weight of copolymer. Urea is believed to serve as both a plasticizer and as a humectant which retards the flash off of moisture during extrusion blowing. It is envisioned that other substances also could serve these purposes, but it is expected that suitability would depend on compatibility with both the starch and the synthetic moieties of the copolymer.

Other additives which may be incorporated into the composition in order to impart specific properties to the film include those conventionally incorporated into packaging films such as fungicides, insect repellents, dyes, static inhibitors, antioxidants, opacifying agents, stabilizers, etc. These materials may be employed in conventional amounts as determined by the skilled artisan.

It is theorized that after extrusion blowing, the starch portion of the copolymer reverts back to a rigid polymer because of rapid evaporation of the water that serves as plasticizer during blowing. The resulting film is thus rendered dimensionally stable for prolonged periods of time if it is stored under conditions of low to moderate relative humidity. However, at relative humidities approaching 100%, the starch portion of the film imbibes enough water from the atmosphere to plasticize it and permit it to flow. Since the synthetic moiety of the film is already above its glass transition temperature, the film shrinks because of relaxation of high-molecular-weight polymer chains which had been stretched and extended during the blowing operation. Shrinkage amounts to about 40% in the machine direction (the direction of flow through the extruder) and about 60% in the transverse direction. When placed around irregularly shaped objects, these films conform within a few minutes to the object shape without formation of stress cracks. Since films contain about 30-60% starch, they can be removed easily after soaking the encapsulated object for a few minutes in water.

It is envisioned that the films of this invention might be used for packaging highly polished or abrasion-sensitive objects such as glassware, dishes, kitchen utensils, tools, and scientific instruments. They might also be useful for packaging heat-sensitive objects that would be damaged by the high temperatures required to apply conventional heat-shrinkable films. Another potential use is for individually sealed fruit and other food products. A critical factor in the industry is that when individually wrapped items are combined and overwrapped, it is desirable that the overwrapping film be dissimilar to the individual wrapping so that the two films do not adhere. The films of the invention have the advantage of being different in composition from the petroleum-based films conventionally used. Because of their starch content, the films of the invention are biodegradable after use. Another advantage of these films is that they do not require fuel for heating shrink tunnels as used for conventional heat-shrinkable films.

The following examples further illustrate the invention but should not be construed as limiting the invention which is defined by the claims.

All percents herein disclosed are "by weight" unless otherwise specified.

EXAMPLE 1

Preparation of Graft Copolymers

A suspension of 100 g. (dry basis) of cationic waxy corn starch with degree of substitution of 0.035 (a derivatized corn starch sold under the trade name "Amaizo 220", American Maize-Products Co.) in 2 l. of water was stirred and purged with a stream of nitrogen while heating to 95° C. After heating at 95° C. for 30 min., the resulting starch dispersion was cooled to 40° C., and 150 g. of methyl acrylate was added, followed after 5 min. by a solution of 3.38 g. of ceric ammonium nitrate in 30 ml. of 1 N nitric acid. The mixture was stirred under nitrogen at about 40-45° C. for 2 hr. and was neutralized to pH 7 with 5 N sodium hydroxide. The crude product was precipitated with excess methanol, separated by filtration, washed twice with methanol, and air dried. The air-dry product was embrittled by cooling to about $-10°$ C. and ground to less than 40 mesh in a Waring blender. Moisture content was about 4%, and the product contained about 58% poly(methyl acrylate), which is equivalent to about 92% conversion of monomer to polymer. Extraction of a portion of the product with acetone indicated that about 66% of the poly(methyl acrylate) was grafted onto the cationic starch, and the remaining 34% was in the form of ungrafted homopolymer.

EXAMPLE 2

Extrusion Blowing of Graft Copolymers

A solution of 4.7 g. of urea in 15 ml. of water was added to 90 g. of the starch graft copolymer (4% moisture) prepared in Example 1, and the mixture was stirred thoroughly with a spatula. The mixture was then blended by passage three times through an extruder attached to a Brabender Plasti-Corder (Type PL-V300, C. W. Brabender Instruments, Inc.) operating at about 80 r.p.m. The extruder screw was ¾ in. in diameter, had a length-to-diameter ratio of 25, and a compression ratio of 2:1. The die had 16 holes of 1/16 in. diameter. Temperatures of the three-zone extruder were: 70° C. (inlet zone), 80° C., and 90° C. (zone nearest the die). The extrudate was then blown to a film by passing it through the same extruder except that the screw was rotated at about 20 r.p.m. and the above die was replaced with a ½-in. blown film die heated at 95° C. The resulting film ranged in thickness from 0.001-0.002 in., and the moisture content was about 9.7%. Test specimens were cut in the machine direction and were measured before and after equilibration at different relative humidities to determine shrinkage. The results are reported in the Table below.

TABLE

| % Relative Humidity | % Shrinkage In Width | % Shrinkage In Length |
| --- | --- | --- |
| 50 | 0 | 0 |
| 65 | 1 | 3 |
| 75 | 40 | 21 |
| 100[a] | 62 | 39 |

[a] At this relative humidity, the moisture content of the film increased to 15.6% and the film thickness increased about 320%.

Pieces of blown film tubing were fitted loosely around different irregularly shaped objects and exposed at room temperature to an atmosphere of 100% relative humidity. Within 30 min., the films had shrunk and encapsulated the objects; there were no breaks in the films in regions of high strain. Films have been observed to be stable for more than a year at room temperature and humidity without any evidence of deterioration. However, when encapsulated objects are placed in warm water for a period of about 1.5–2.0 min., the films imbibe water and can be removed easily by rubbing with the fingers.

EXAMPLE 3

Unmodified Starch Graft Copolymer

A composition was prepared as described in Example 1 except that unmodified starch was substituted for the cationic waxy corn starch. The product contained about 59% poly(methyl acrylate), which is equivalent to about 96% conversion of monomer to polymer. Extraction of a portion of the product with acetone indicated that about 78% of the poly(methyl acrylate) was grafted onto the unmodified starch, and the remaining 22% was in the form of ungrafted homopolymer. When this product was extrusion blown as in Example 2, the resulting balloon was unacceptably small in diameter, and test specimens that were cut from the film curled excessively. Shrinkage data were not obtained. The results obtained in this example show that unsatisfactory films are obtained from graft copolymers with unmodified starch.

EXAMPLE 4

Ungrafted Synthetic Mixture of Cationic Waxy Corn Starch and Poly(Methyl Acrylate)

A composition was prepared as described in Example 1 except that 4.81 g. of ammonium persulfate in 20 ml. of water plus 2.01 g. of sodium metabisulfite in 20 ml. of water were substituted for the ceric ammonium nitrate in 1 N. nitric acid. (The substituted chemicals are well known to effect polymerization of the methyl acrylate without initiating grafting of the polymer onto the derivatized starch.) Analysis of the product indicated that about 93% polymerization of the methyl acrylate had occured, but 93% of the resulting poly(methyl acrylate) was in the form of ungrafted homopolymer. When this product was extrusion blown as in Example 2, the resulting balloon did not expand sufficiently because of the formation of holes as a result of the extreme softness of the film. The results of this example show that unsatisfactory films are obtained when the synthetic polymer is merely mixed physically with the modified starch rather than molecularly grafted onto the starch.

EXAMPLE 5

Ungelatinized Cationic Waxy Corn Starch

A composition was prepared as described in Example 1 except that the suspension of cationic waxy corn starch in water was maintained at 25° C., and this temperature was held throughout the reaction with methyl acrylate in the presence of the ceric ammonium nitrate and the subsequent neutralization with sodium hydroxide. The product contained about 59% poly(methyl acrylate), which is equivalent to about 97% conversion of monomer to polymer. Extraction of a portion of the product with acetone indicated that about 73% of the poly(methyl acrylate) was grafted onto the cationic starch, and the remaining 27% was in the form of ungrafted homopolymer. When this product was extrusion blown as in Example 2, the resulting balloons were uneven in thickness; they lost air, and the films became wrinkled. The results obtained in this example show that unsatisfactory films are formed when the modified starch is not thoroughly dispersed prior to graft polymereization.

It is understood that the foregoing detailed description is given merely by way of illustration and that modification and variations may be made therein without departing from the spirit and scope of the invention.

We claim:

1. A moisture-shrinkable, film-forming composition comprising: (1) a graft copolymer of a hot water-soluble modified starchy material and a synthetic monomer, wherein said monomer is characterized as yielding upon polymerization a polymer having a glass transition temperature of less than about 35° C.; and (2) a plasticizer.

2. A composition as described in claim 1 wherein said modified starchy material is a derivatized starch.

3. A composition as described in claim 1 wherein said modified starchy material is a partially depolymerized starch.

4. A composition as described in claim 1 wherein the ratio of synthetic monomer to starchy material is in the range of 40:60 to about 70:30 on a dry weight basis.

5. A composition as described in claim 1 wherein said plasticizer is water.

6. A composition as described in claim 5 wherein said plasticizer is aqueous urea.

7. A dimensionally stable, stretched film produced from the composition of claim 1.

8. A dimensionally stable, stretched film produced from the composition of claim 2.

9. A dimensionally stable, stretched film produced from the composition of claim 3.

10. A dimensionally stable, stretched film produced from the composition of claim 4.

11. A dimensionally stable, stretched film produced from the composition of claim 5.

12. A dimensionally stable, stretched film produced from the composition of claim 6.

13. A method of preparing a moisture-shrinkable film comprising the steps of:

a. blending at a temperature in the range of about 70°–90° C. a composition comprising: (1) a graft copolymer of a hot water-soluble, modified starchy material and a synthetic monomer, wherein said monomer is characterized as yielding upon polymerization a polymer having a glass transition temperature of less than about 35° C.; and (2) a suitable amount of a plasticizer;

b. forming said blended composition into a film;
c. stretching the film into a stretched state; and
d. rendering the film dimensionally stable in the stretched state.

14. The method as described in claim 13 wherein said plasticizer is water.

15. The method as described in claim 13 wherein said plasticizer is aqueous urea.

16. The method as described in claim 15 wherein steps (b), (c) and (d) are accomplished by extrusion blowing.

17. A film produced by the method of claim 16.

* * * * *